US007765863B1

(12) United States Patent
Woolsey

(10) Patent No.: US 7,765,863 B1
(45) Date of Patent: Aug. 3, 2010

(54) PHOSPHORESCENT WIND INDICATOR

(75) Inventor: Wayne Woolsey, 3389 Greens Ln., Fayetteville, AR (US) 72703

(73) Assignee: Wayne Woolsey, Fayetteville, AR (US)

( * ) Notice: Subject to any disclaimer, the term of this patent is extended or adjusted under 35 U.S.C. 154(b) by 123 days.

(21) Appl. No.: 12/012,799

(22) Filed: Feb. 5, 2008

Related U.S. Application Data

(60) Provisional application No. 60/899,457, filed on Feb. 5, 2007.

(51) Int. Cl.
*G01P 13/00* (2006.01)
(52) U.S. Cl. .................................................. 73/170.04
(58) Field of Classification Search ........................ None
See application file for complete search history.

(56) References Cited

U.S. PATENT DOCUMENTS

| 3,112,645 | A | * | 12/1963 | Glass | ....................... | 73/170.04 |
| 3,672,870 | A | * | 6/1972 | Rhydderch | .................... | 75/525 |
| 4,423,626 | A | | 1/1984 | Herschede | .................... | 73/188 |
| 5,186,118 | A | | 2/1993 | Stinson | ...................... | 116/214 |
| 5,291,778 | A | | 3/1994 | Dexheimer et al. | ...... | 73/170.05 |
| 6,550,418 | B2 | | 4/2003 | Williamson | ................. | 116/264 |
| 6,631,800 | B1 | | 10/2003 | Keeven | ........................ | 206/37 |

\* cited by examiner

*Primary Examiner*—Lisa M Caputo
*Assistant Examiner*—Jermaine Jenkins
(74) *Attorney, Agent, or Firm*—Keisling & Pieper, PLC; Trent C. Keisling

(57) ABSTRACT

A wind gauge includes particles dispensed from their container as a floating cloud which is carried along by ambient wind and thus illustrates wind speed and direction. The particulate media may also include a mixture of phosphorescent and chalk particles, so that the floating cloud is illuminable and thus more easily visible especially during low-light and nocturnal conditions. The particles may also embody a scent and be used to form a scent trail as they are carried along by the wind and as they gradually settle out of the air. The container includes an internal light source for discreetly phosphorescing the particles while inside the container. The container may also be compressible with a restricted exit that forcefully ejects particles therefrom.

18 Claims, 13 Drawing Sheets

PHOSPHORESCENT WIND INDICATOR

CROSS-REFERENCE TO RELATED APPLICATIONS

This application claims priority to and is a continuation-in-part of U.S. provisional Ser. No. 60/899,457 filed on Feb. 5, 2007 entitled PHOSPHORESCENT WIND INDICATOR.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document may contain material that is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to wind speed and direction gauging and especially to the use of a visibly detectable floating cloud for this purpose. In particular, the invention relates to the use of a phosphorescent wind indicator that may be used during low-light or nocturnal conditions to indicate wind speed and direction. Known art may be found in U.S. Class 73, Subclasses 170.04 and 170.05 and U.S. Class 116, Subclasses 214 and 264 and other relevant areas.

II. Description of the Known Art

As will be appreciated by those skilled in the art, the strength and direction of the wind during hunting can be critically important given the superior olfactory senses in most game. This information becomes especially important when the hunter must target his quarry at relatively short distances (i.e. when hunting with a bow, muzzleloader or shotgun, or hunting in dense brush or similar conditions, etc.). This information is also important when setting up tree stands and the like for hunting from a fixed location.

Hunters and other sports enthusiasts have heretofore mainly had only makeshift methods and devices available to them for gauging wind speed and direction. This is particularly desirable for hunting purposes, since game downwind from a hunter will avoid the hunter's position if the animals detect the hunter's scent. To avoid detection by the prey, hunters often attempt to monitor the wind and remain downwind therefrom. For bow hunters, in addition to gauging the general ambient conditions of wind speed and direction, it is also important to accurately gauge the particular windage that an arrow will experience when it is shot, since the wind has a significant affect on the trajectory of arrows.

In an attempt to accurately determine the wind speed and direction, meteorologists have used such things as balloons and chemical smoke dispensers which emit smoke which is visually monitored. Variations of such chemical dispensers may be mounted on the barrel of a hunter's rifle or otherwise set up by the hunter. However, chemical odors emitted by these dispensers, along with the odor of smoke, are easily detected by animals. Such odors are easily strong enough to be detected by the animal Consequently, the animals are alerted to the hunter's presence, and move away from the hunter.

In an attempt to generate a wind gauge which animals will not detect, powder-like hydrophobic material, such as unscented raw talc or magnesium trisilicate has been used in an effort to create a wind-borne cloud which the hunter may visually observe. A small amount of the talc material is sprayed into the air by means of a manually operated squeeze bottle. The speed and direction of travel of a cloud created by the dispersed talc is then observed to determine prevailing wind conditions. In actual practice, however, the raw talc settles out of the air relatively quickly and thus drifts only a short distance from the hunter's position. Additionally, the talc cloud is difficult to see. Thus, it is difficult at best for the hunter to actually gauge wind direction and velocity by observing a talc cloud.

It is important for bow hunters to accurately determine the windage which an arrow will experience during the flight to the target. Accuracy is particularly critical, as animals are often alerted to the hunter's presence by the first arrow a hunter shoots, regardless of whether the hunter hits an animal. Because heretofore known powders tend to settle to the ground relatively quickly and are difficult to see, they do not really form an airborne cloud, do not drift far, and once they move away from the point of dispersion hunters can no longer see them. Thus, known windage-gauging powders do not in fact provide hunters with an accurate gauge by which to judge the windage that will act on their arrows.

In addition, many hunters use blinds which they have built either on the ground or elevated from the ground, such as platforms or other such structures secured in trees which may be either temporary or fixed. Elevated blinds are particularly advantageous as most game, and in particular large animals such as deer and the like, are not thought to be upwardly observant, largely concentrating their surveillance to a horizontal line of sight. Thus, although extremely wary by nature, game such as deer are known to frequently walk directly beneath a hunter occupying an elevated blind in a tree.

Regardless of whether the blind is elevated or on the ground, hunters must remain downwind from the game they hunt or the animals will detect the hunter's scent. The animals are wary of unfamiliar scents, and consequently, avoid moving upwind when they sense an unfamiliar scent. Accordingly, hunters often try to monitor the wind direction and maintain a downwind position relative to the prey.

Relatively recently, temporary blinds known as climbing tree stands have become popular. These stands normally permit a hunter to climb up a particular tree for hunting and then to climb back down when finished hunting. These climbing stands may be advantageously deployed the day of a hunt and then redeployed in another locale subsequently. They can be particularly effective for the hunter because they permit the hunter to hunt a particular locale from a variety of adjacent dispositions to enable the hunter to vary his hunting stand as the wind changes direction. For example, a hunter desiring to hunt at a feeding locale would have to have four adjacent fixed stands to adequately cover the one feeding locale to take into consideration wind from a easterly, westerly, northerly or southerly direction. With a climbing stand, the hunter simply deploys the stand in the appropriate downwind location with respect to the feeding locale and only one stand instead of four is required. Of course, knowing the direction the wind is blowing is a prerequisite to appropriately placing such a stand.

For hunters using blinds, the position of the blind is fixed and scents are emitted from the blind and carried downwind. Thus, only those animals upwind from a blind will approach it. To avoid detection by animals downwind from blinds, hunters sometimes use masking scents to conceal their own scent. Such masking scents are familiar to game and consequently do not alert the wary animals. In one attempt to cover their scent, hunters have used a masking scent which permeates the talc powder used in an effort to create a wind gauge. The talc powder absorbs the masking scent, such as acorn, pine, apple, cedar or the like. However, as indicated above, talc powder does not travel far, and accordingly the scented powder does not adequately cover the hunter's scent.

In an attempt to attract animals such as deer to a particular location, such as a blind from which they are hunting, hunters also dispense certain scents along a trail leading to that location. However, leaving a scent trail requires that the hunter physically travel over the trail. The hunter's movement along the trail while physically dispensing the scent may well disturb and frighten animals, and the hunter's own scent is often left on the trail. Consequently, animals are likely to move away from the trail instead of being attracted by the scent dispensed by the hunter.

The known art have proposed solutions to these problems. For example, U.S. Pat. No. 4,423,626 issue to Herschede on Jan. 3, 1984, shows a method for avoiding detection by game animals by scent through establishing wind direction to insure that the hunter is positioned downwind from the animal. In the method, a small quantity of a hydrophobic material such as unscented raw talc powder, which may be mixed with a natural masking scent material, is sprayed into the air in a relatively small cloud by means of a hand-held manually operated squeeze bottle. The direction of travel in the air of the cloud of material may then be used to establish wind direction. The material is such as to be undetectable by smell by the animal, and the size and characteristics of the powder cloud is such as to be visually undetectable by the animal at a distance.

U.S. Pat. No. 5,186,118 issued to Stinson on Feb. 16, 1993, shows a fluorescent thermoplastic which is mixed with a silica to form a highly-visible floating powder cloud. The thermoplastic is odorless and easily visible to hunters. Accordingly, a hunter is able to observe the cloud for large distances and accurately gauge the wind direction and velocity. Because the thermoplastic powder is odorless, and because animals are basically colorblind, animals are not alerted by the floating cloud of colored particles.

U.S. Pat. No. 5,291,778 issued to Dexheimer, et al, on Mar. 8, 1994, shows an indicator member is arranged for mounting to a barrel portion of a hunting rifle or to an interior surface of a hunting archery bow to include a boss mounting a filament, wherein the filament indicates wind orientation preventing hunter positioning to be exposed by downwind orientation of game. A hollow supporting boss is arranged to secure the filament and may be further provided with an interior spool to permit projection of the filament therefrom from a magazine support roll.

U.S. Pat. No. 6,550,418 issued to Willaimson on Apr. 22, 2003, shows a refillable receptacle for housing and dispensing a fibrous, windborne material is disclosed. The receptacle includes a closure cap having one or more apertures for dispensing said fibrous material and has a threaded bottom for attachment to, and replacement of, the windage/elevation cap an optical scope. The threaded bottom also allows the device to be attached to an archery bow or bow stabilizer. The bottom of the device may also be adapted so as to allow attachment of the device to pliable articles such as fabric or clothing or to rigid articles such rails or platforms.

U.S. Pat. No. 6,631,800 issued to Keevan on Oct. 14, 2003, shows A dispenser for fibers for use by a sportsman and adapted to be attached to an article of clothing or gear worn by the sportsman. The dispenser is a capsule with a body and a cap with apertures that can be aligned. When the apertures are aligned, fibers can be reached and pulled out of the dispenser in wisps for use by the sportsman.

The known art however fails to address low-light and nocturnal conditions adequately. Since many hunters normally position themselves in locales known to be frequented by their quarry, such as game trials, feeding locations, territorial marking locations and the like, during low-light or nocturnal conditions, it is important to provide a method for ascertaining this important information at these times. This can be especially important when setting up temporary elevated blinds such as a climbing tree stand and the like.

Thus, a perceived need exists in the art for an improved phosphorescent indicator for hunters. It is, therefore, an object of the present invention to eliminate the problems inherent with existing known methods and apparatus.

SUMMARY OF THE INVENTION

The present invention provides a novel and useful solution to the foregoing problems in the form of a very fine, lightweight and easily visible phosphorescent powder, which a hunter may easily disperse into the air to create a wind-borne cloud for gauging the wind direction and velocity. Furthermore, the novel wind gauge in accordance with the invention provides an easily visible particulate emission which can remain airborne and travel long distances under the influence of the wind.

Accordingly, a major object and advantage of the invention is to provide a particulate emission which is easily dispensed in a cloud formed fine-consistency phosphorescent particles, easily discernible when dispersed by a hunter. Because of the small size of the particles emitted, the airborne particulate emission is carried for large distances under the control of air currents.

In one embodiment of the invention, a scent is used to permeate the particles making up the particulate emission. When the powder is dispersed by the hunter, air currents will carry the low-density particles over large distances before they finally settle out and fall to earth. Thus, a floating scent trail is formed without the hunter leaving the blind, and the resulting scent trail attracts animals to the hunter's position.

Embodiments of the invention include a phosphorescent chalk that is crushed to form a highly-visible floating powder cloud. The phosphorescent chalk is odorless or optionally desirable scented and easily visible to hunters, especially during low-light and nocturnal conditions. Accordingly, a hunter is able to observe the cloud for large distances and accurately gauge the wind direction and velocity. Because the chalk is odorless, and because animals are basically colorblind, animals are not alerted by the floating cloud of phosphorescent particles.

Thus, a primary object of the present invention is to provide a phosphorescent indicator that is easily adjustable deployed to determine wind direction and to gauge wind speed.

Yet another basic object of the present invention is to create a phosphorescent indicator that will make for more easily deployable downwind hunting stands during low-light and nocturnal conditions.

A related object of the present invention is to enable a hunter to set up an elevated stand during darkness that is advantageously deployed relative to wind direction.

Another object of the present invention is to create a reliable windage indicator.

Another object of this invention is provide a user with a simpler means of determining windage.

Another object of this invention is to provide a retrofittable device that can be installed on a hunting device after purchase.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
FIG. 1 is an environmental view showing one exemplary embodiment in accordance with the invention herein where a hunter is determining wind direction for setting up a temporary stand.
Figure 2:
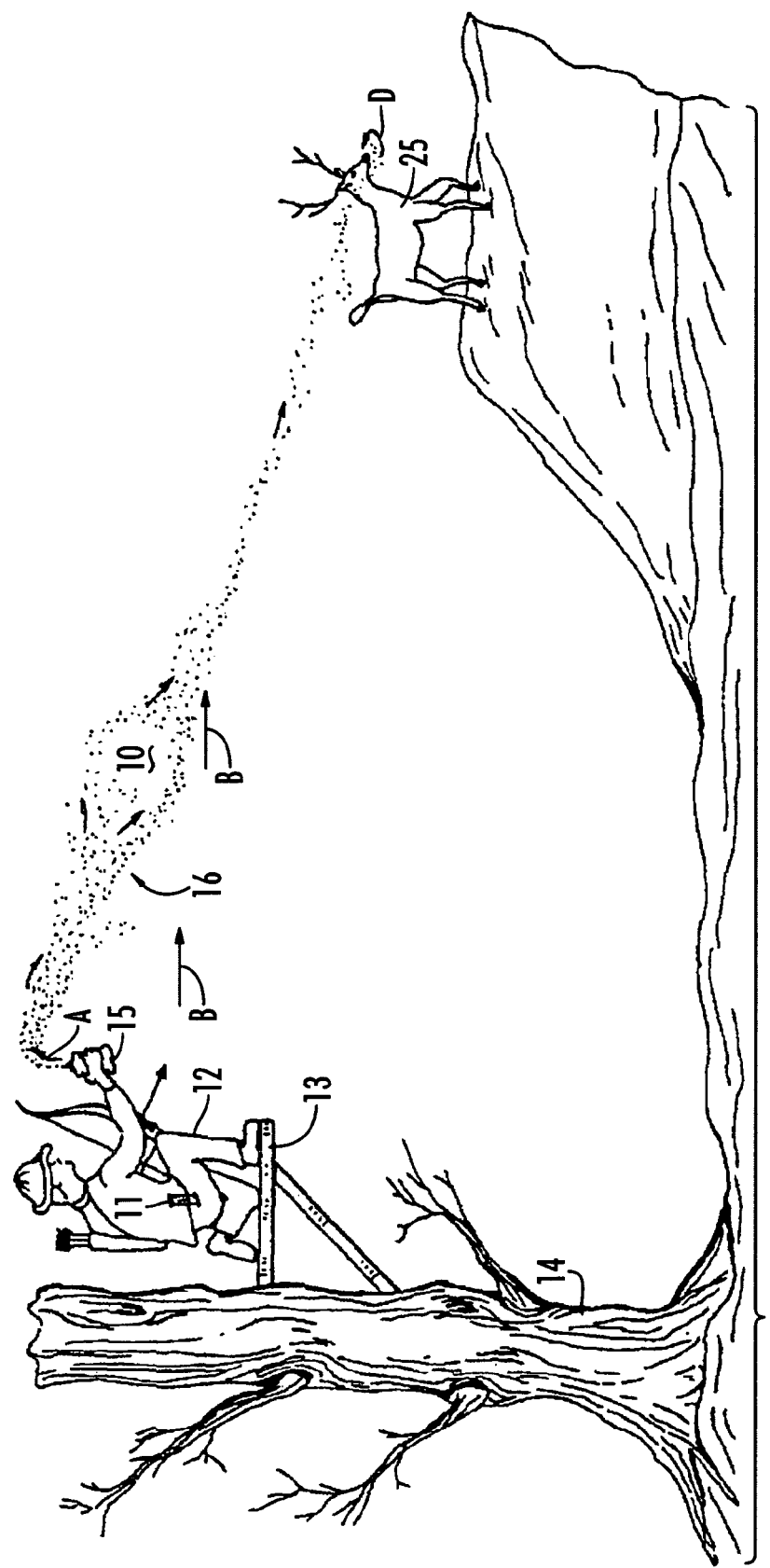
FIG. 2 is an environmental view showing an exemplary embodiment in accordance with the invention herein where the hunter is positioned in a stand.

As generally illustrated in FIGS. 1 and 2, the present invention includes a novel wind gauge powder 10 that may be utilized to detect the wind speed and direction B. A hunter 12 desiring to position a platform blind 13 in a tree 14 dispenses powder 10 into the air using a container 15. Powder 10 is dispensed upwardly from container 15 in direction A when the container is quickly compressed. The dispensed particulate emission is instantly dispersed to form a floating cloud 16 which is carried by the influence of wind B away from hunter 12. The hunter watches the travel of cloud 16 to determine the direction and velocity of wind B. Of course, hunter 12 may also disperse the particulate matter 10 while on a stand (FIG. 2)

FIG. 2 depicts the novel wind gauge powder 10 in accordance with the invention utilized to detect the wind speed and direction B. A hunter 12 in a platform blind 13 in a tree 14 dispenses powder 10 into the air using a container 15. Powder 10 is dispensed upwardly from container 15 in direction A when the container is quickly compressed. The dispensed particulate emission is instantly dispersed to form a floating cloud 16 which is carried by the influence of wind B away from hunter 12. The hunter watches the travel of cloud 16 to determine the direction and velocity of wind B.

Powder 10 comprises mixture of calcium sulfate dihydrate ($CaSO_4 2H_2O$) particles in combination with a phosphorescent component. The powder may be formed form either discrete components or an integrated commercial component. A conventional blackboard chalk (for example, obtained from any number of commercial sources such as Wal-Mart, Target, etc.) may be used in combination with a suitable phosphorescent agent such as phosphorescent pigments including zinc sulfide copper compounds and the like (for example, a product known as P-1000 supplied by Conrad-Hanovia, Inc., Newark, N.J. or a product known as 6 SSU, supplied by United Mineral and Chemical Corporation, New York, N.Y.). A conventional phosphorescent blackboard chalk where a phosphorescent coating has already been applied to a chalk may also be utilized. Suitable phosphorescent chalk is readily obtained from a wide variety of commercial sources including Wal-Mart, Target, and the like. The phosphorescent chalk obtained from these commercial sources comprises a conventional blackboard chalk covered by a phosphorescent coating that may or may not extend throughout the body of the chalk. The primary consideration for the phosphorescent compound is that it become luminescent after a relatively short exposure to an ultraviolet source such as a flashlight or the like for a temporary period of time before ceasing to be luminescent. Preferably, the phosphorescent component will only require 30 seconds or so of exposure to become luminescent and extinguish within about two minutes after the ultraviolet exposure ceases.

Regardless of whether a normal chalk combined with a phosphorescent component or a phosphorescent chalk are selected for use, the chalk and phosphorescent component are combined and ground to a very small size, i.e. preferably of sub-micron particle size (which is considered to be less than one-tenth micron and not practically measurable) but at least of sufficiently small size to permit buoyancy in air for a period of time. A homogenous mixture of the chalk and phosphorescent coating may be formed by vigorously comminuting the discrete chalk pieces into very small particles in a conventional hammermill or the like.

The particulate size of the particles may be from about 100 microns and more preferable from about 10 microns and smaller until essentially dust. Such particles can be buoyant and carried by the wind over large distances in cloud form. This type of particulate media is also resistant to moisture and caking when stored in a container and is nontoxic and nonhazardous to humans if inhaled.

The calcium sulfate particles thus homogeneously mixed with phosphorescent particles increases the visibility of the cloud 16, which is particularly desirable in view of the extremely long persistence of the floating cloud and the corresponding distance it will travel. The phosphorescent component is also nontoxic and nonhazardous to humans. Surprisingly, the ground phosphorescent chalk was found to be far superior to other powders such as talc or magnesium trisilicate or other known combinations. The phosphorescence renders the powder highly visible and accordingly generate a highly visible cloud 16, especially during low-light and nocturnal conditions. The small size of the particles permits the cloud to remain airborne and clearly visible over very large distances.

Figure 3:
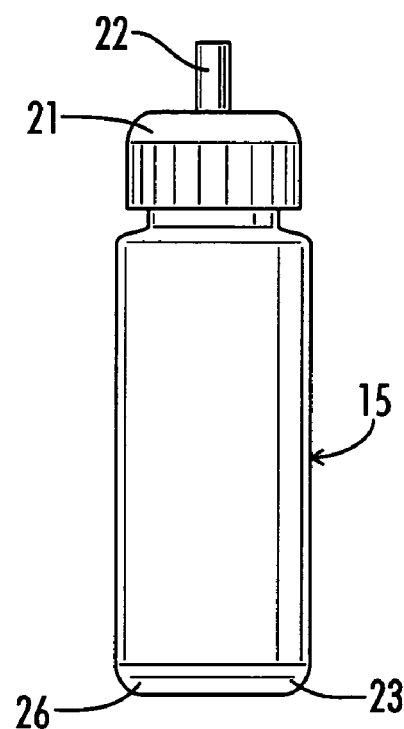
FIG. 3 is a side elevational view of a squeeze bottle containing the powder for dispersion into the air; and, FIG. 4 is a front sectional view of the squeeze bottle for dispersing the powder according to the invention.
Figure 4:
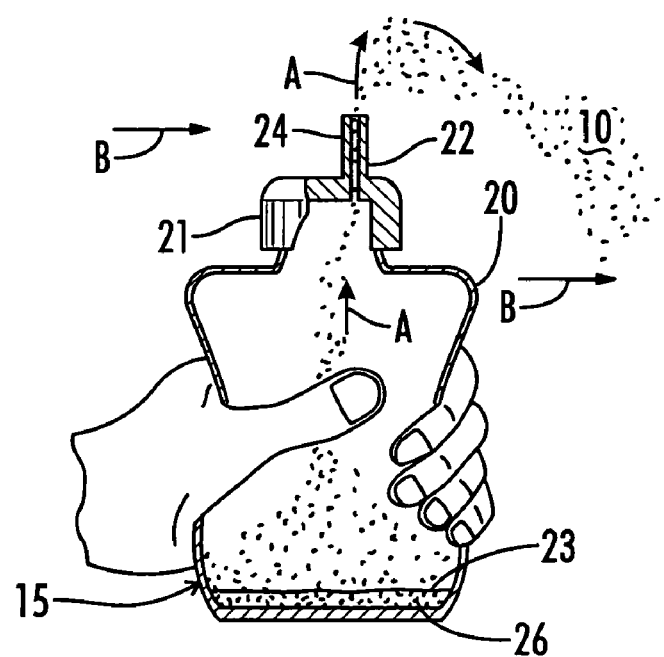

Referring now to FIGS. 3 and 4, the mixture of phosphorescent chalk particles which forms the preferred powder media 10 is preferably placed within a container 15, which may be a conventional container such as a plastic squeeze bottle. Container 15 includes a compressible polymeric housing 20. Housing 20 may be, by way of example, a 32-ounce polypropylene squeeze bottle which is closed by a cap 21. Of course, other known dispensers may be used to carry and dispense the particles. Cap 21 includes a folding dispenser snout 22. The snout 22 has a bore or passage 24 therethrough having a diameter of about 0.15 centimeter. While other diameters may be used, this diameter generated an ideal emission and dispersion tunnel for the airborne particulate media as described above.

In one alternative embodiment of the invention where scent is to be carried by the floating cloud of media, a layer of neutral viscous fluid 23, impregnated with a scent illustrated by the numeral 26 in FIGS. 2 and 3, is disposed along the bottom of container 15. The phosphorescent chalk mixture is next placed in container 15 over the viscous fluid. The container is most preferably filled to no more than 75% of its maximum capacity by the total mixture. The top 25% of the container volume will accordingly be air, which provides the pressure for dispensing the particles when housing 20 is sharply compressed. Cap 22 is secured to the top of the housing 20 after the mixture is placed therein. The masking scent 23 is quickly absorbed into the particles after the mixture is placed in the container. Most preferably, the scents are apple/deer musk and acorn/deer musk, although many others may also be used. These scents are quickly absorbed into each particle of the mixture such that each particle dispersed from the container carries the scent.

Figure 5:
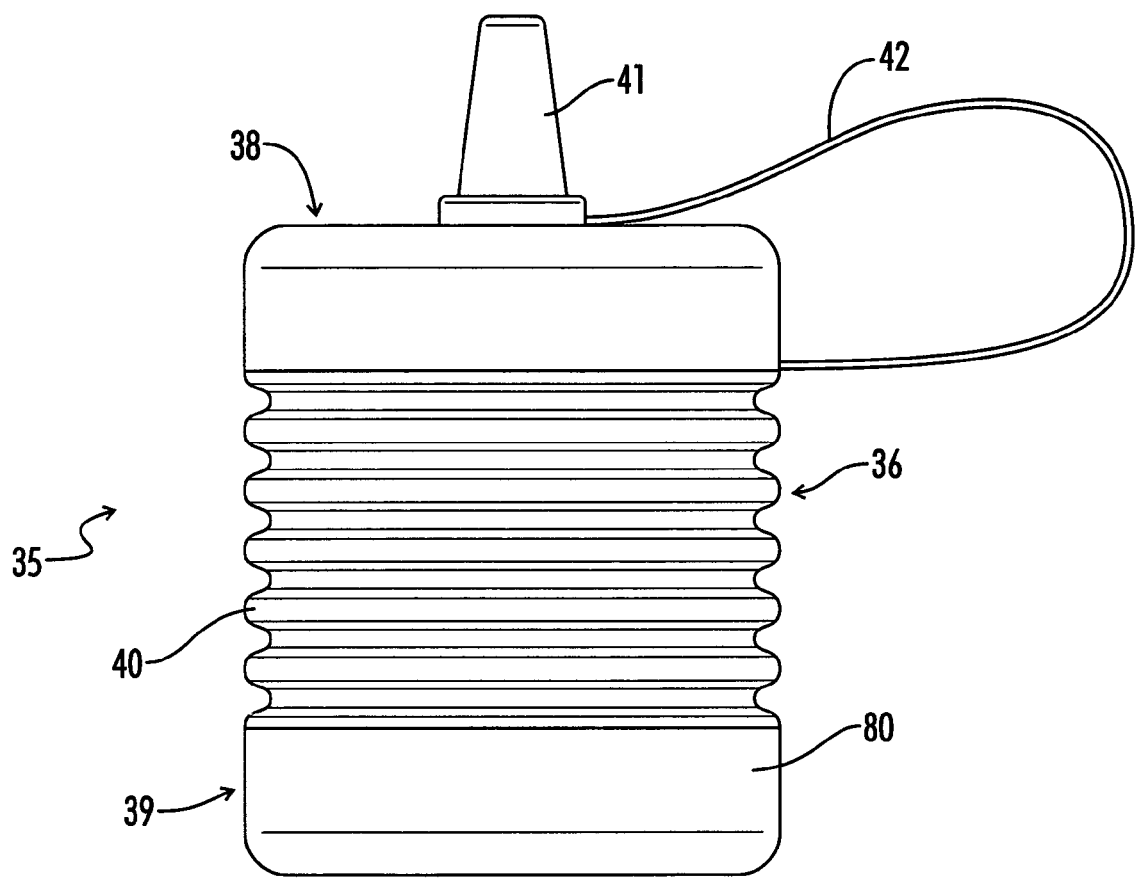
FIG. 5 is a front plan view of another exemplary embodiment in accordance with the invention herein.
Figure 6:
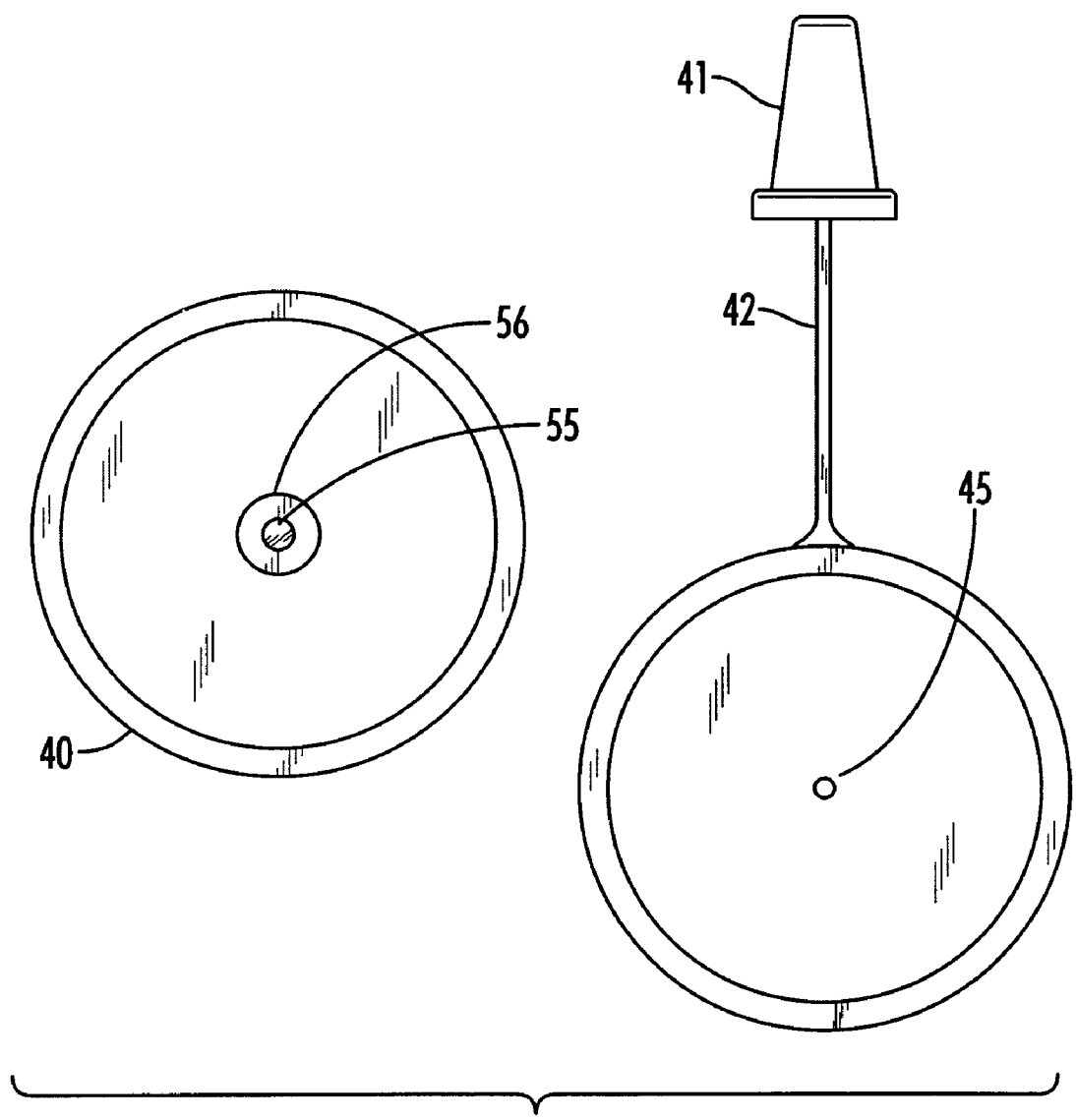
FIG. 6 is a top plan view thereof with the cap removed to show the internal components of the housing.
Figure 7:
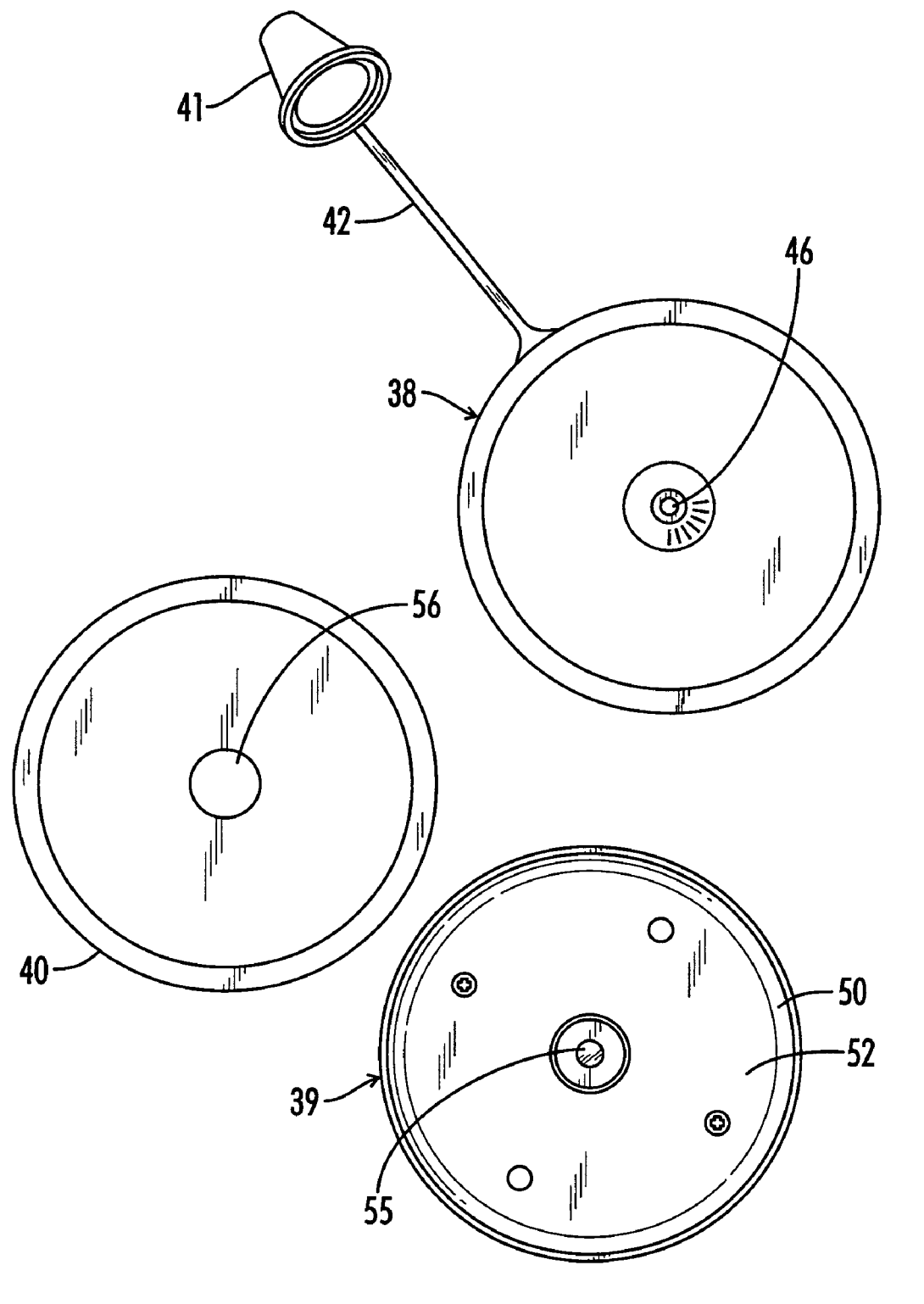
FIG. 7 is a top plan view thereof with the cap and the base removed to show the internal layout of the housing.

Referring now to FIGS. 5-7, another exemplary embodiment in accordance with the invention present invention is shown. The container 35 has an elongated cylindrical hollow body 36 with removable top 38 and a spaced apart removable bottom 39. The body 36 includes a compressible polymeric housing 40. Housing 40 may be, by way of example, a 32-ounce polypropylene squeeze bottle which is closed at one end and open at the opposite end and covered by the threaded top 38 with a bore therethrough that is covered by a removable cap 41. Of course, other known dispensers may be used to carry and dispense the particles. Cap 41 includes an elongated retention strap 42 that may be affixed to the dispenser housing 40 to secure the cap 41 thereto.

Cap 41 covers an outlet bore or dispenser 45 that penetrates the top 38 when the container 35 is closed. The dispenser 45 has a bore or passage 46 therethrough where the diameter of the bore tapers from an enlarged opening to a substantially restricted exit to form a venturi. Various tapering diameters may be used, provided they eject the housed powders with sufficient velocity to adequately spread the ejected powder into the air to form a visible cloud as described above.

The container bottom 39 includes a hollow base 50. Base 50 includes a compartment 52 for housing a battery and a lowermost switch for activating a light emitting diode 55 (a.k.a. led) to radiate powders inside the housing 40. The closed housing end contains a port 56 permitting the led to protrude into the housing 40. Thus, the led 55 may be selectively switched on by a user to illuminate material in the housing 40.

Figure 8:
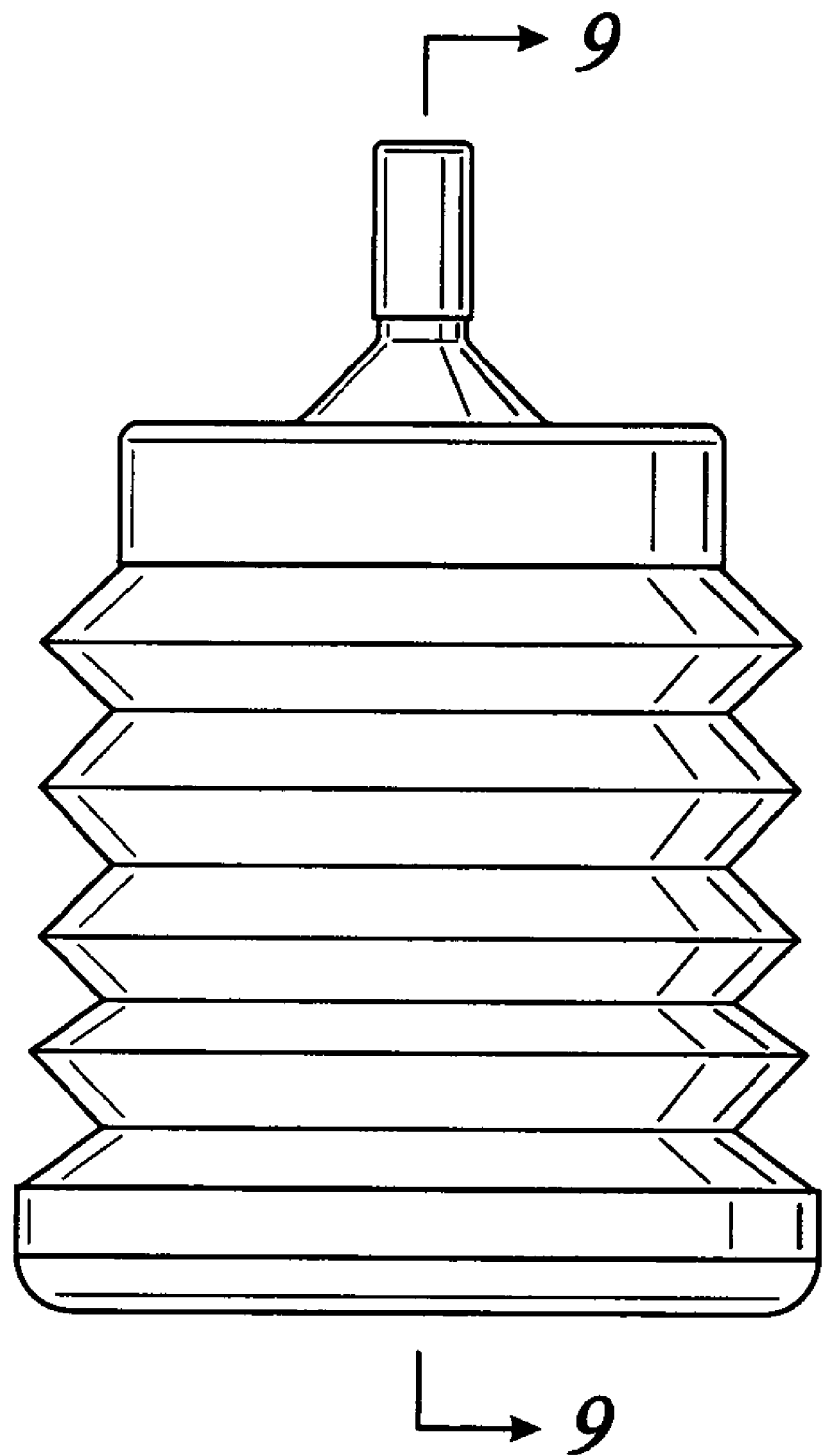
FIG. 8 is a front view thereof another exemplary embodiment in accordance with the invention herein.
Figure 9:
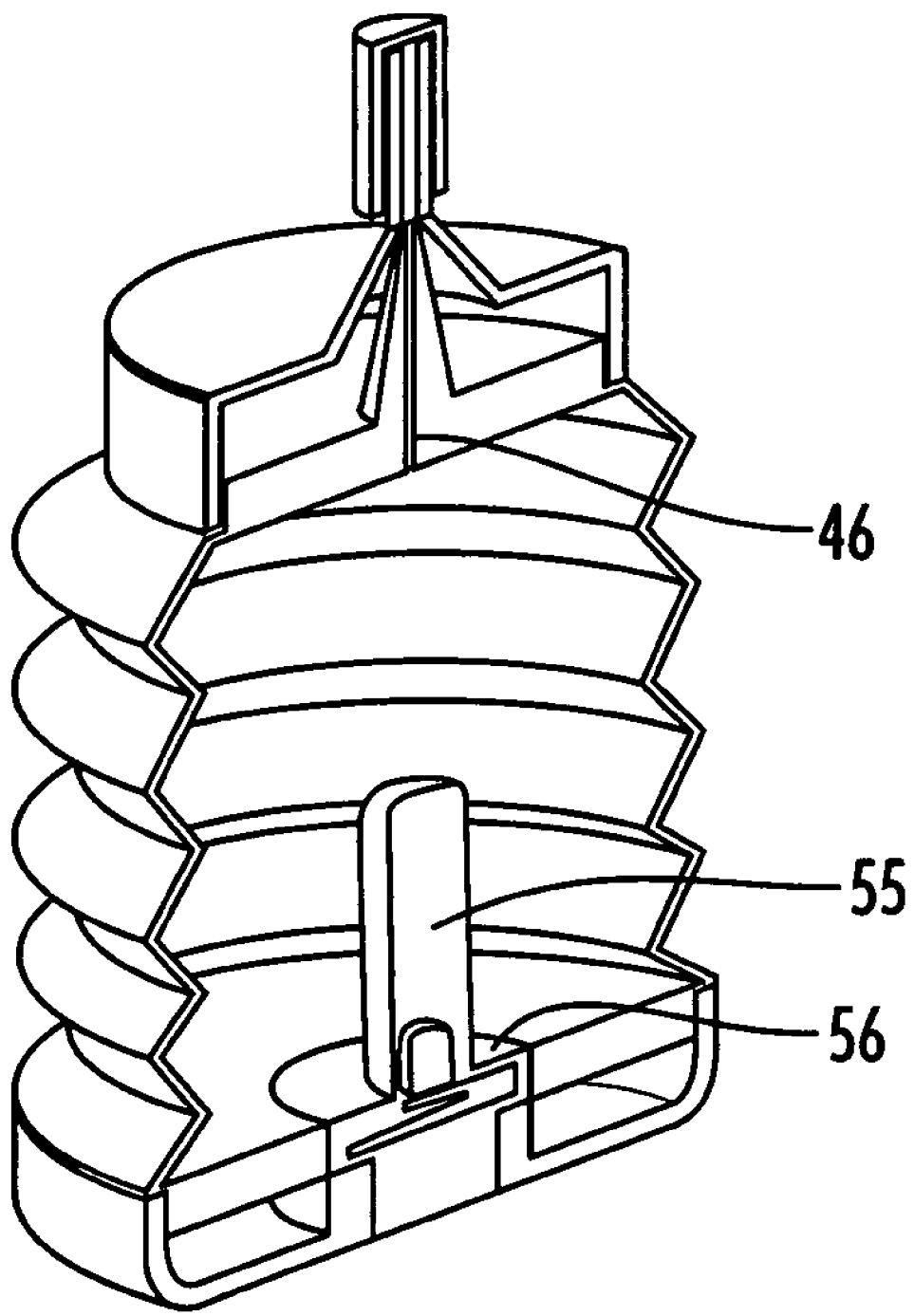
FIG. 9 is a cross-sectional view along lines 9-9 of FIG. 8 showing the internal layout thereof.
Figure 10:
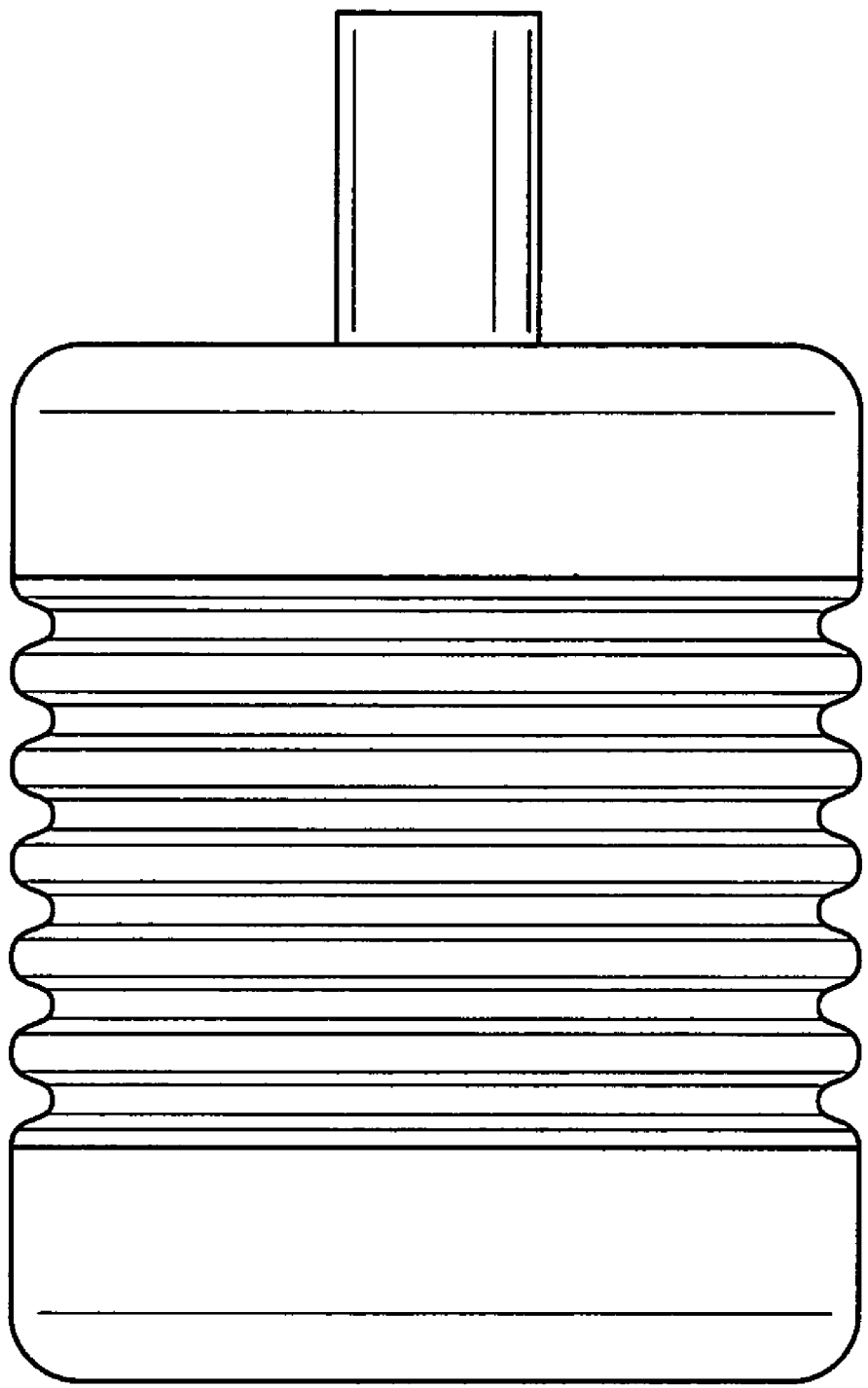
FIG. 10 is a front plan view of another exemplary embodiment in accordance with the invention herein.
Figure 11:
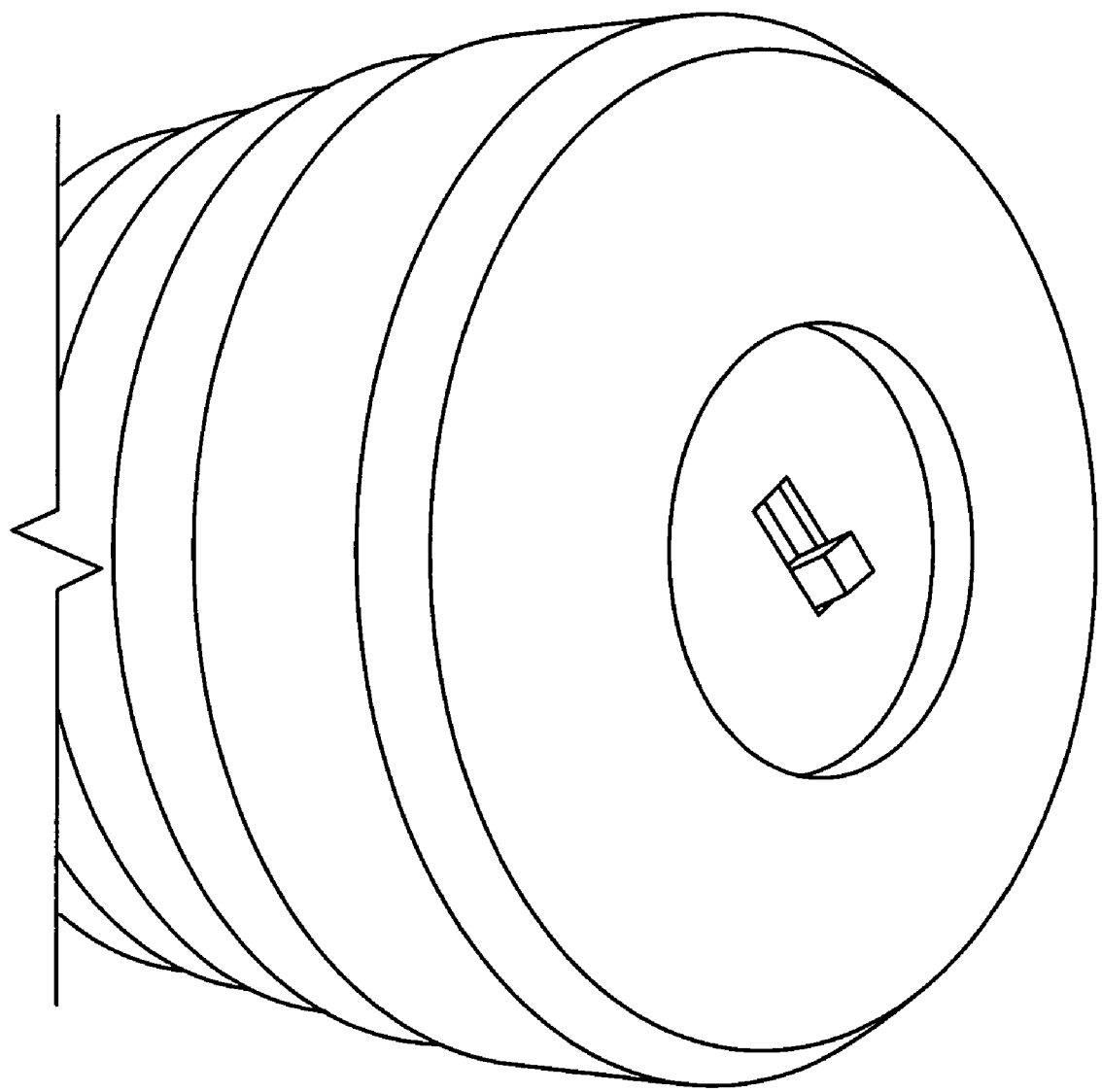
FIG. 11 is a perspective view showing the bottom of the container and the switch in the base.
Figure 12:
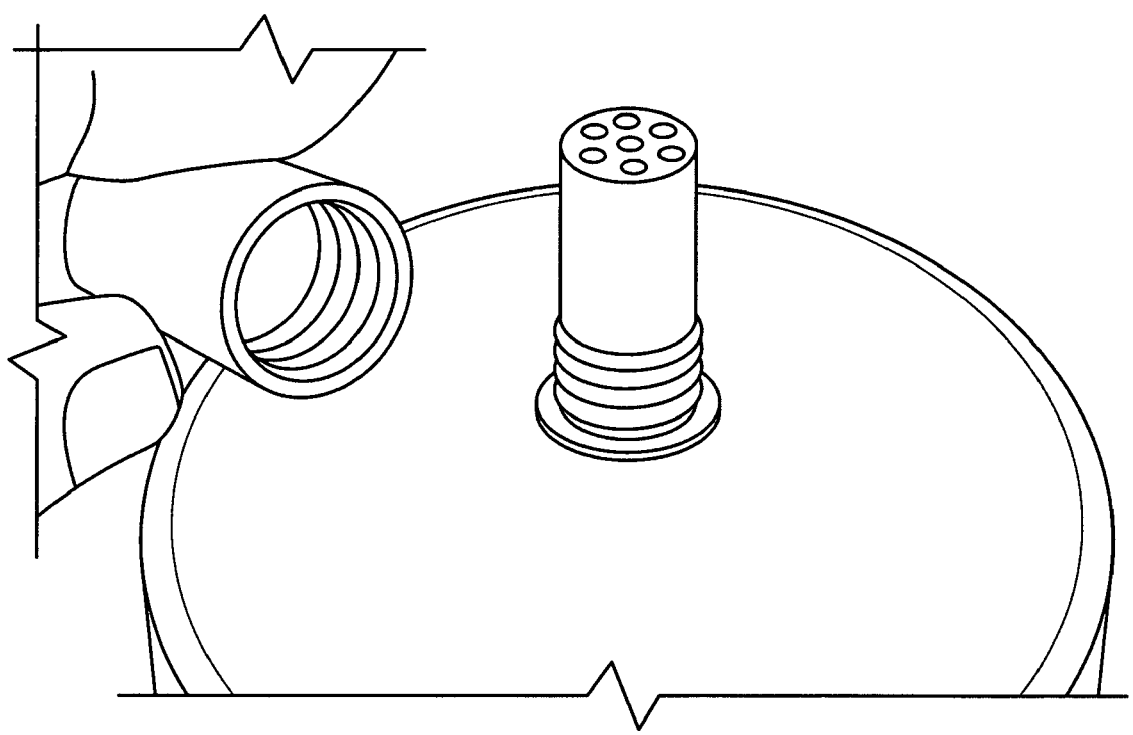
FIG. 12 is a perspective view thereof with the cap removed to show the internal components of the housing.
Figure 13:
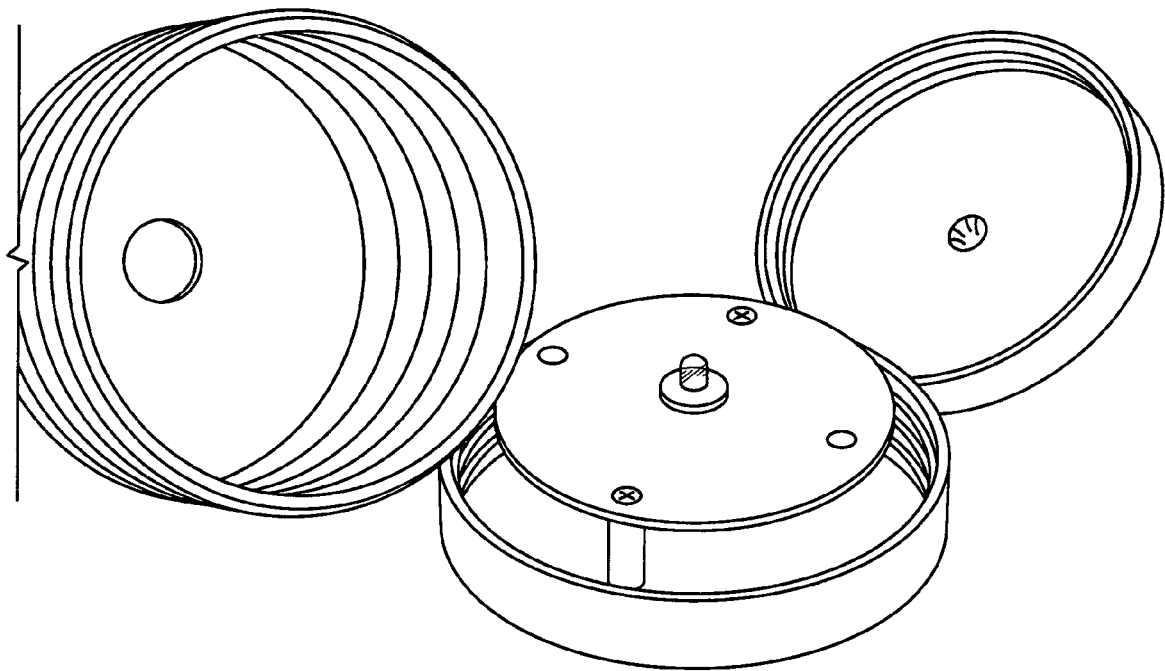
FIG. 13 is a perspective view thereof with the top and the base removed to show the internal layout of the housing; and, FIG. 14 is a perspective view showing the bottom of the container with the base removed therefrom.
Figure 14:
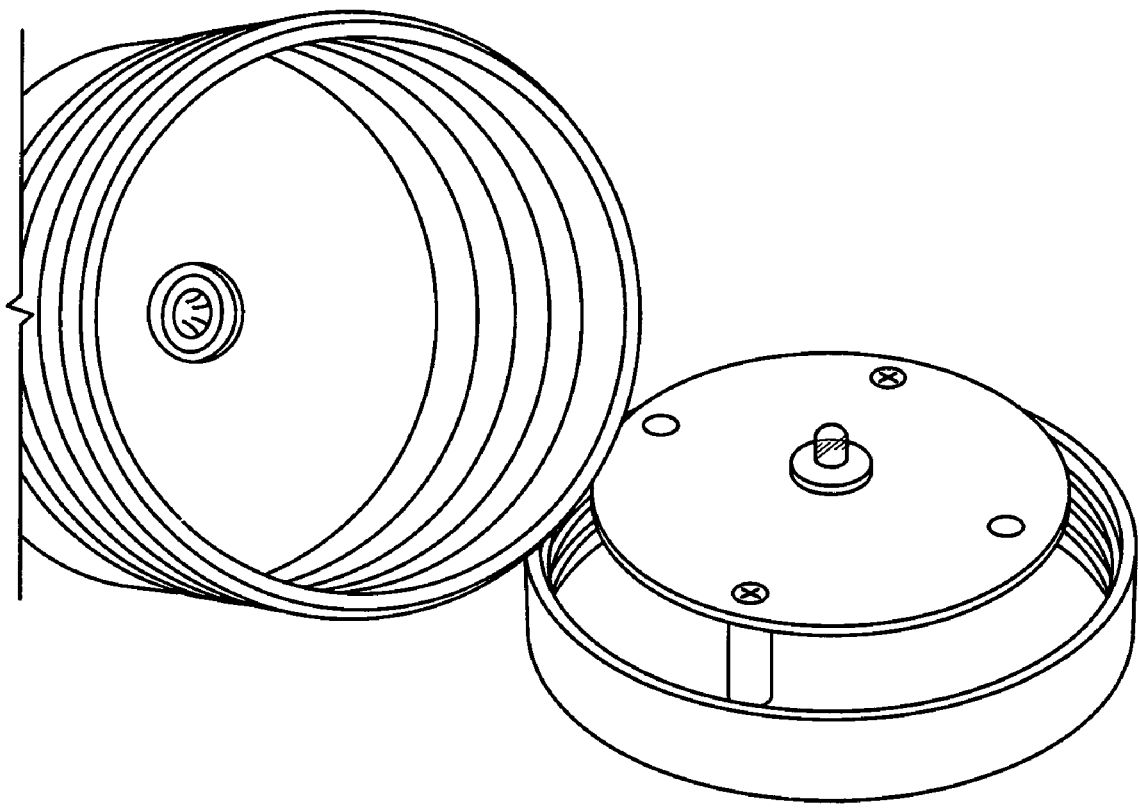

Referring now to FIGS. 8 and 9, another exemplary embodiment in accordance with the invention present invention is shown. This embodiment works similarly to the preceding embodiment with differences in the cap structure.

Referring now to FIGS. 10-14, another exemplary embodiment in accordance with the invention present invention is shown. This embodiment works similarly to the preceding embodiment with differences in the cap structure.

In operation, a hunter first exposes the powder 10 to an ultraviolet light source, such as a flashlight 11 or the like, for a short period of time (i.e. approximately 30 seconds to a few minutes). The bottle 15 may be shaken during this exposure to ensure uniform exposure of the powder 10 on blind 13 rapidly squeezes the bottle to disperse a small particulate emission, which then forms the cloud 16. The cloud 16 formed by the particulate emission is carried by wind B to location D remote from the hunter. During low-light or nocturnal conditions, the phosphorescent nature of the powder 10 permits the hunter to view the resulting trail for a few minutes before the luminescence of the powder 10 fades. Once the powder luminescence fades, the dispensed powder essentially melts into the ground where it is not readily visible to the game. Within a few minutes of the removal of the exposure of the light source to the bottle 15, the remaining powder in the bottle will lose its luminescence as well.

The hunter may also elect to dispense the powder 10 while on blind 13. In this operation, the hunter rapidly squeezes the bottle to disperse a small particulate emission, which then forms the cloud 16. The cloud 16 formed by the particulate emission is carried by wind B to location D remote from the hunter. As indicated above, because of the small size of the particles in cloud 16, the particulate emission hangs in the air for some time and is carried airborne over a significant distance. For example, the particle cloud will be carried by even very light winds over distances of at least 200 yards. If the wind is stronger, the powder may be carried over distances exceeding a mile. A deer 25 downwind from hunter 12 will detect the scent, and may be attracted to the hunter's blind 13 from a considerable distance away. Even though the size of the particles is small, the thermoplastic particles having a bright orange pigmentation are readily visible to the hunter for great distances. The hunter watches cloud 16 as it is carried by the wind, and accordingly gauges the wind direction and speed as the wind carries the scent-impregnated cloud along. Additionally, because the cloud is visible for large distances and does not settle to the ground rapidly, hunter 12 may accurately gauge the windage that will affect arrow 26 as it travels toward deer 25 when the hunter shoots the arrow.

In accordance with the novel wind gauge method and apparatus provided herewith, a readily visible mixture and dispenser is provided which may be very conveniently carried by a hunter. The small size of the particles facilitates the responsiveness of the cloud formed thereby to ambient wind currents Accordingly, the particulate emission created by the mixture is carried at a velocity approximately equal to the wind velocity. A hunter observing the movement of cloud 16 may accurately determine the wind velocity and thus gauge the windage which will act on arrows shot from the blind. Additionally, the particulate emission is carried by the wind over large distances. A scent trail resulting from the powder as it gradually settles out of the air is long and attracts animals to the hunter from large distances. Because the particles carried by the wind may be essentially scentless, they will not themselves alert or frighten the game; alternatively, since they may be given a relatively strong, familiar scent, animals such as deer 25 will not detect the hunter's unfamiliar scent. Accordingly, animals may thus be attracted to the hunter's position.

Accordingly, it will be seen that a novel and highly useful device for hunters is provided in accordance herewith, by which the windage may be detected and a scent distributed along a scent trail leading to a hunter's blind. As may be appreciated, the preferred mixture disclosed and described herein is efficient and economic to manufacture, and is useable over an extended period, thereby facilitating its ownership and utilization by a hunter.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiment shown and described in detail herein, or may make various changes in structural details to the illustrated embodiment, all such alternative or modified embodiments which utilize the concepts of the invention and clearly incorporate the spirit thereof are to be considered as within the scope of the claims appended here below, unless such claims by their language specifically state otherwise.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A wind gauge of the type comprising a dispensable particulate media which when windborne indicates the wind direction, comprising a powder formed of a phosphorescent compound combined with chalk, wherein said powder provides a cloud-like dispersion when dispensed into the air and said dispersion being airborne under the influence of ambient wind and readily visually observable to gauge windage as it is carried by the wind and wherein said powder phosphoresces for at least ten minutes after exposure to an ultraviolet light source for less than one minute.

2. The wind gauge as defined in claim 1 wherein said powder is formed from dihydrated calcium sulfate combined with a phosphorescing compound such as zinc sulfide copper.

3. The wind gauge as defined in claim 2 wherein said powder has a phosphorescent ability sufficient to enable a user to view the powder during low-light and nocturnal conditions.

4. The wind gauge as defined in claim 1 wherein the maximum particle size of said dihydrated calcium sulfate particles is approximately 0.5 to 10 microns.

5. The wind gauge as defined in claim 4 wherein said powder phosphoresces for at least ten minutes after exposure to an ultraviolet light source for less than one minute.

6. The wind gauge as defined in claim 5 wherein said media includes a selected scent component.

7. A hunting device comprising:

a squeezable container;

a powder comprising phosphorescent chalk particles contained within said container;

a light source in the container and adapted to selectively expose powder housed inside said container to an ultraviolet light source to radiate said powder; and, said container responsive to compressive force to dispense said powder outwardly from said container to form an airborne particulate emission which is at least temporarily visually observable.

8. The hunting device as defined in claim 7 wherein said powder includes a discrete chalk component, said chalk component formed from dihydrated calcium sulfate and said powder includes a discrete phosphorescing component, said phosphorescing component being formed from zinc sulfide copper.

9. The hunting device as defined in claim 8 wherein the maximum particle size of said particles is approximately 0.5 to 10 microns and wherein said powder includes a selected scent component.

10. The hunting device as defined in claim 8 wherein said container further comprises a battery adapted to provide electrical power to said light source and a switch adapted to control the light source.

11. The hunting device as defined in claim 10 wherein said powder phosphoresces for at least ten minutes after exposure to an ultraviolet light source for less than one minute and has a phosphorescent ability sufficient to enable a user to view the powder during low-light and nocturnal conditions.

12. A hunter's dispenser which emits a particulate cloud-like dispersion that is airborne under the influence of ambient wind, comprising:

a dispenser housing;

a quantity of fine, lightweight phosphorescent chalk particles of less than 100 micron particle size disposed inside said housing, said phosphorescent chalk particles being dispensable from said housing and being sufficiently buoyant to form a particulate cloud-like dispersion which remains airborne for a substantial interval under the influence of the wind;

an internal light source inside said housing adapted to selectively expose particles therein to an ultraviolet light source to radiate said powder;

a battery secured to said housing and adapted to provide electrical power to said light source; and, a user operable switch on said housing and adapted to control the light source.

13. The dispenser as defined in claim 12 further comprising a scent media in said housing, said scent media being carried with said buoyant phosphorescent chalk particles upon their dispensing from said housing, whereby said airborne phosphorescent chalk particles and scent media provide a scent trail of long persistence and whereby said phosphorescent chalk particles thereby enhance visual determination of said scent trail.

14. The dispenser as defined in claim 12 wherein said particles include a discrete chalk component, said chalk component formed from dihydrated calcium sulfate and said particles include a discrete phosphorescing component, said phosphorescing component being formed from zinc sulfide copper.

15. The dispenser as defined in claim 12 wherein said particles phosphoresces for at least ten minutes after exposure to an ultraviolet light source and has a phosphorescent ability sufficient to enable a user to view the powder during low-light and nocturnal conditions.

16. The dispenser as defined in claim 15 wherein the maximum particle size of said particles is approximately 0.5 to 10 microns.

17. The dispenser as defined in claim 16 wherein said scent media is absorbed by said phosphorescent chalk particles and said scent media comprises a deposit of viscous fluid disposed in said housing within said quantity of phosphorescent chalk particles.

18. The dispenser as defined in claim 17 wherein said housing is compressible to dispense said particles and wherein said housing further comprises a venture tip to enhance the velocity of exiting particles.

* * * * *